US008667279B2

(12) United States Patent
Rao

(10) Patent No.: US 8,667,279 B2
(45) Date of Patent: Mar. 4, 2014

(54) SYSTEMS AND METHODS FOR SECURELY PLACE SHIFTING MEDIA CONTENT

(75) Inventor: Padmanabha R. Rao, Palo Alto, CA (US)

(73) Assignee: Sling Media, Inc., Foster City, CA (US)

( * ) Notice: Subject to any disclaimer, the term of this patent is extended or adjusted under 35 U.S.C. 154(b) by 986 days.

(21) Appl. No.: 12/166,039

(22) Filed: Jul. 1, 2008

(65) Prior Publication Data

US 2010/0005483 A1    Jan. 7, 2010

(51) Int. Cl.
*H04L 29/06* (2006.01)
(52) U.S. Cl.
USPC ........... 713/168; 713/169; 713/170; 713/171; 713/172; 713/173; 380/201; 380/202; 380/203
(58) Field of Classification Search
USPC ....................................................... 713/168
See application file for complete search history.

(56) References Cited

U.S. PATENT DOCUMENTS

| | | | |
|---|---|---|---|
| 3,416,043 A | 12/1968 | Jorgensen | |
| 4,254,303 A | 3/1981 | Takizawa | |
| 5,161,021 A | 11/1992 | Tsai | |
| 5,237,648 A | 8/1993 | Mills et al. | |
| 5,386,493 A | 1/1995 | Degen et al. | |
| 5,434,590 A | 7/1995 | Dinwiddie, Jr. et al. | |
| 5,493,638 A | 2/1996 | Hooper et al. | |
| 5,602,589 A | 2/1997 | Vishwanath et al. | |
| 5,661,516 A | 8/1997 | Carles | |
| 5,666,426 A | 9/1997 | Helms | |
| 5,682,195 A | 10/1997 | Hendricks et al. | |
| 5,706,290 A | 1/1998 | Shaw et al. | |
| 5,708,961 A | 1/1998 | Hylton et al. | |
| 5,710,605 A | 1/1998 | Nelson | |
| 5,722,041 A | 2/1998 | Freadman | |
| 5,757,416 A | 5/1998 | Birch et al. | |
| 5,774,170 A | 6/1998 | Hite et al. | |
| 5,778,077 A | 7/1998 | Davidson | |
| 5,794,116 A | 8/1998 | Matsuda et al. | |
| 5,822,537 A | 10/1998 | Katseff et al. | |

(Continued)

FOREIGN PATENT DOCUMENTS

| CN | 1464685 | 12/2003 |
|---|---|---|
| CN | 1623324 A | 6/2005 |

(Continued)

OTHER PUBLICATIONS

USPTO, Final Office Action, mailed Nov. 6, 2009; U.S. Appl. No. 09/809,868, filed Mar. 15, 2001.

(Continued)

*Primary Examiner* — Longbit Chai
(74) *Attorney, Agent, or Firm* — Ingrassia Fisher & Lorenz, P.C.

(57) ABSTRACT

Systems and methods are provided for securely providing a place-shifted media stream from a place shifting device to a remote player via a communications network. A request for a connection is received from the remote player at the place shifting device via the communications network. In response to the request for the connection, an authorization credential is requested from a central server via the communications network. Further, in response to the authorization credential received from the central server, the place-shifted media stream between the place shifting device and the remote player can be established over the communications network. At least a portion of the place-shifted media stream may be encrypted based upon the authorization credential.

38 Claims, 4 Drawing Sheets

(56) References Cited

U.S. PATENT DOCUMENTS

| | | |
|---|---|---|
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,434,113 B1 | 8/2002 | Gubbi |
| 6,442,067 B1 | 8/2002 | Chawla et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Masud et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,124,366 B2 | 10/2006 | Foreman et al. |
| 7,151,575 B1 | 12/2006 | Landry et al. |
| 7,155,609 B2 | 12/2006 | Chan et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | DaCosta |
| 7,424,747 B2 | 9/2008 | DeTreville |
| 7,430,686 B1 | 9/2008 | Wang et al. |
| 7,464,396 B2 | 12/2008 | Hejna, Jr. |
| 7,502,733 B2 | 3/2009 | Andrsen et al. |
| 7,505,480 B1 | 3/2009 | Zhang et al. |
| 7,506,377 B2 | 3/2009 | Hanks |
| 7,565,681 B2 | 7/2009 | Ngo et al. |
| 7,874,003 B2 | 1/2011 | Takashima |
| 7,912,952 B2 | 3/2011 | Mizutani et al. |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0031333 A1 | 3/2002 | Mano et al. |
| 2002/0046404 A1 | 4/2002 | Mizutani |
| 2002/0053053 A1 | 5/2002 | Nagai et al. |
| 2002/0064096 A1 | 5/2002 | Ukita et al. |
| 2002/0080753 A1 | 6/2002 | Lee |
| 2002/0090029 A1 | 7/2002 | Kim |
| 2002/0105529 A1 | 8/2002 | Bowser et al. |
| 2002/0112247 A1 | 8/2002 | Horner et al. |
| 2002/0122137 A1 | 9/2002 | Chen et al. |
| 2002/0131497 A1 | 9/2002 | Jang |

(56) References Cited

U.S. PATENT DOCUMENTS

| | | |
|---|---|---|
| 2002/0138843 A1 | 9/2002 | Samaan et al. |
| 2002/0143973 A1 | 10/2002 | Price |
| 2002/0147634 A1 | 10/2002 | Jacoby et al. |
| 2002/0147687 A1 | 10/2002 | Breiter et al. |
| 2002/0167458 A1 | 11/2002 | Baudisch et al. |
| 2002/0188818 A1 | 12/2002 | Nimura et al. |
| 2002/0191575 A1 | 12/2002 | Kalavade et al. |
| 2002/0196939 A1* | 12/2002 | Unger et al. .................. 380/216 |
| 2003/0001880 A1 | 1/2003 | Holtz et al. |
| 2003/0009668 A1 | 1/2003 | Chan et al. |
| 2003/0028873 A1 | 2/2003 | Lemmons |
| 2003/0065915 A1 | 4/2003 | Yu et al. |
| 2003/0093260 A1 | 5/2003 | Dagtas et al. |
| 2003/0095791 A1 | 5/2003 | Barton et al. |
| 2003/0115167 A1 | 6/2003 | Sharif et al. |
| 2003/0159143 A1 | 8/2003 | Chan |
| 2003/0187657 A1 | 10/2003 | Erhart et al. |
| 2003/0192054 A1 | 10/2003 | Birks et al. |
| 2003/0208612 A1 | 11/2003 | Harris et al. |
| 2003/0231621 A1 | 12/2003 | Gubbi et al. |
| 2004/0003406 A1 | 1/2004 | Billmaier |
| 2004/0052216 A1 | 3/2004 | Roh |
| 2004/0068334 A1 | 4/2004 | Tsai et al. |
| 2004/0083301 A1 | 4/2004 | Murase et al. |
| 2004/0091109 A1 | 5/2004 | Son et al. |
| 2004/0100486 A1 | 5/2004 | Flamini et al. |
| 2004/0103340 A1 | 5/2004 | Sundareson et al. |
| 2004/0139047 A1 | 7/2004 | Rechsteiner et al. |
| 2004/0162845 A1 | 8/2004 | Kim et al. |
| 2004/0162903 A1 | 8/2004 | Oh |
| 2004/0172410 A1 | 9/2004 | Shimojima et al. |
| 2004/0205830 A1 | 10/2004 | Kaneko |
| 2004/0212640 A1 | 10/2004 | Mann et al. |
| 2004/0213273 A1 | 10/2004 | Ma |
| 2004/0216173 A1 | 10/2004 | Horoszowski et al. |
| 2004/0230806 A1 | 11/2004 | Lisanke |
| 2004/0236844 A1 | 11/2004 | Kocherlakota |
| 2004/0255249 A1 | 12/2004 | Chang et al. |
| 2005/0021398 A1 | 1/2005 | McCleskey et al. |
| 2005/0027821 A1 | 2/2005 | Alexander et al. |
| 2005/0038981 A1 | 2/2005 | Connor et al. |
| 2005/0044058 A1 | 2/2005 | Matthews et al. |
| 2005/0050462 A1 | 3/2005 | Whittle et al. |
| 2005/0053356 A1 | 3/2005 | Mate et al. |
| 2005/0055595 A1 | 3/2005 | Frazer et al. |
| 2005/0060759 A1 | 3/2005 | Rowe et al. |
| 2005/0097542 A1 | 5/2005 | Lee |
| 2005/0114852 A1 | 5/2005 | Chen et al. |
| 2005/0132351 A1 | 6/2005 | Randall et al. |
| 2005/0138560 A1 | 6/2005 | Lee et al. |
| 2005/0198584 A1 | 9/2005 | Matthews et al. |
| 2005/0201726 A1 | 9/2005 | Malcolm et al. |
| 2005/0204046 A1 | 9/2005 | Watanabe |
| 2005/0216851 A1 | 9/2005 | Hull et al. |
| 2005/0227621 A1 | 10/2005 | Katoh |
| 2005/0229118 A1 | 10/2005 | Chiu et al. |
| 2005/0246369 A1 | 11/2005 | Oreizy et al. |
| 2005/0251833 A1 | 11/2005 | Schedivy |
| 2005/0262496 A1 | 11/2005 | Seki et al. |
| 2005/0283791 A1 | 12/2005 | McCarthy et al. |
| 2005/0288999 A1 | 12/2005 | Lerner et al. |
| 2006/0011371 A1 | 1/2006 | Fahey |
| 2006/0021057 A1 | 1/2006 | Risan et al. |
| 2006/0031381 A1 | 2/2006 | Van Luijt et al. |
| 2006/0050970 A1 | 3/2006 | Gunatilake |
| 2006/0051055 A1 | 3/2006 | Ohkawa |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095942 A1 | 5/2006 | Van Beek |
| 2006/0095943 A1 | 5/2006 | Demircin et al. |
| 2006/0107226 A1 | 5/2006 | Matthews et al. |
| 2006/0117371 A1 | 6/2006 | Margulis |
| 2006/0146174 A1 | 7/2006 | Hagino |
| 2006/0161635 A1 | 7/2006 | Lamkin et al. |
| 2006/0280157 A1 | 12/2006 | Karaoguz et al. |
| 2007/0003224 A1 | 1/2007 | Krikorian et al. |
| 2007/0005783 A1 | 1/2007 | Saint-Hillaire et al. |
| 2007/0022328 A1 | 1/2007 | Tarra et al. |
| 2007/0074115 A1 | 3/2007 | Patten et al. |
| 2007/0076604 A1 | 4/2007 | Litwack |
| 2007/0168543 A1 | 7/2007 | Krikorian et al. |
| 2007/0180485 A1 | 8/2007 | Dua |
| 2007/0198532 A1 | 8/2007 | Krikorian et al. |
| 2007/0234213 A1 | 10/2007 | Krikorian et al. |
| 2007/0286596 A1 | 12/2007 | Lonn |
| 2008/0005676 A1 | 1/2008 | Evans et al. |
| 2008/0019276 A1 | 1/2008 | Takatsuji et al. |
| 2008/0037573 A1 | 2/2008 | Cohen |
| 2008/0059533 A1 | 3/2008 | Krikorian |
| 2008/0066185 A1 | 3/2008 | Lester et al. |
| 2008/0083035 A1 | 4/2008 | Dong et al. |
| 2008/0134267 A1 | 6/2008 | Moghe et al. |
| 2008/0155702 A1 | 6/2008 | Bala et al. |
| 2008/0195744 A1 | 8/2008 | Bowra et al. |
| 2008/0199150 A1 | 8/2008 | Candelore |
| 2008/0240444 A1* | 10/2008 | Shuster .................. 380/277 |
| 2008/0267398 A1 | 10/2008 | Peterka et al. |
| 2008/0294759 A1 | 11/2008 | Biswas et al. |
| 2008/0307456 A1 | 12/2008 | Beetcher et al. |
| 2008/0307462 A1 | 12/2008 | Beetcher et al. |
| 2008/0307463 A1 | 12/2008 | Beetcher et al. |
| 2009/0070884 A1 | 3/2009 | Wu et al. |
| 2009/0074380 A1 | 3/2009 | Boston et al. |
| 2009/0199248 A1 | 8/2009 | Ngo et al. |
| 2010/0005483 A1 | 1/2010 | Rao |
| 2010/0064055 A1 | 3/2010 | Krikorian et al. |
| 2010/0064332 A1 | 3/2010 | Krikorian et al. |
| 2010/0100915 A1 | 4/2010 | Krikorian et al. |
| 2010/0129057 A1 | 5/2010 | Kulkarni |
| 2010/0146527 A1 | 6/2010 | Craib et al. |

FOREIGN PATENT DOCUMENTS

| | | |
|---|---|---|
| DE | 4407319 A1 | 9/1994 |
| EP | 0838945 A | 4/1998 |
| EP | 1077407 A1 | 2/2001 |
| EP | 1443766 A2 | 8/2004 |
| EP | 1635502 A1 | 3/2006 |
| EP | 1691550 A | 8/2006 |
| EP | 1830558 A1 | 9/2007 |
| GB | 2307151 A | 5/1997 |
| KR | 19990082855 A | 11/1999 |
| KR | 20010211410 A | 8/2001 |
| WO | 0133839 A1 | 5/2001 |
| WO | 0147248 A2 | 6/2001 |
| WO | 0193161 A1 | 12/2001 |
| WO | 03026232 A1 | 3/2003 |
| WO | 03052552 A2 | 6/2003 |
| WO | 03098897 A | 11/2003 |
| WO | 2004032511 A1 | 4/2004 |
| WO | 2005050898 A2 | 6/2005 |
| WO | 2006064454 A1 | 6/2006 |
| WO | 2006074110 A | 7/2006 |
| WO | 2007027891 A2 | 3/2007 |
| WO | 2007051156 A2 | 5/2007 |
| WO | 2007141555 A2 | 12/2007 |
| WO | 2007149466 A2 | 12/2007 |
| WO | WO 2007/141555 * | 12/2007 |
| WO | 2008024723 A | 2/2008 |

OTHER PUBLICATIONS

USPTO, Final Office Action mailed Nov. 12, 2009; U.S. Appl. No. 11/620,707, filed Jan. 7, 2007.

USPTO, Non-Final Office Action mailed Nov. 23, 2009; U.S. Appl. No. 11/683,862, filed Mar. 8, 2007.

USPTO, Non-Final Office Action mailed Oct. 1, 2009; U.S. Appl. No. 11/778,287, filed Jul. 16, 2007.

USPTO Final Office Action mailed Dec. 30, 2009; U.S. Appl. No. 11/147,664, filed Jun. 7, 2005.

European Patent Office, European Search Report, mailed Sep. 28, 2009 for European Application No. EP 06 78 6175.

(56) References Cited

OTHER PUBLICATIONS

International Search Report for PCT/US2008/069914 mailed Dec. 19, 2008.
PCT Partial International Search, PCT/US2009/054893, mailed Dec. 23, 2009.
Newton's Telecom Dictionary, 21st ed., Mar. 2005.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.
Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.
Srisuresh, P. et al. "Traditional IP Network Address Translator (Traditional NAT)," Network Working Group, The Internet Society, Jan. 2001.
Lucas, Brian et al. "Systems and Methods for Establishing Connections Between Devices Communicating Over a Network," U.S. Appl. No. 12/426,103, filed Apr. 17, 2009.
Thiyagarajan, Venkatesan et al. "Always-on-Top Media Player Launched From a Web Browser," U.S. Appl. No. 12/617,271, filed Nov. 12, 2009.
Paul, John Michael et al. "Systems and Methods for Delivering Messages Over a Network," U.S. Appl. No. 12/619,192, filed Nov. 16, 2009.
Rao, Padmanabha R. et al. "Methods and Apparatus for Establishing Network Connections Using an Inter-Mediating Device," U.S. Appl. No. 12/642,368, filed Dec. 18, 2009.
Dham, Vikram et al. "Systems and Methods for Establishing Network Connections Using Local Mediation Services," U.S. Appl. No. 12/644,918, filed Dec. 22, 2009.
Paul, John et al. "Systems and Methods for Remotely Controlling Media Server Via a Network," U.S. Appl. No. 12/645,870, filed Dec. 23, 2009.
Bajpal, Parimal et al. "Method and Node for Transmitting Data Over a Communication Network using Negative Ackhowledgement," U.S. Appl. No. 12/404,920, filed Mar. 16, 2009.
Bajpal, Parimal et al. "Method and Note for Employing Network connections Over a Connectinoless Transport Layer Protocol," U.S. Appl. No. 12/405,062, filed Mar. 16, 2009.
Asnis, Ilya et al. "Mediated Network address Translation Traversal" U.S. Appl. No. 12/405,039, filed Mar. 16, 2009.
Conway, Frank et al. "Systems and Methods for Creating Variable Length Clips from a Media Stream," U.S. Appl. No. 12/347,465, filed Dec. 31, 2008.
China State Intellectual Property Office "First Office Action," issued Jan. 8, 2010, for Application No. 200810126554.0.
USPTO Final Office action mailed Jan. 25, 2010; U.S. Appl. No. 11/734,277, filed Apr. 12, 2007.
Australian Government "Office Action," Australian Patent Application No. 2006240518, mailed Nov. 12, 2009.
Jain, Vikal Kumar "Systems and Methods for Coordinating Data Communication Between Two Device," U.S. Appl. No. 12/699,280, filed Feb. 3, 2010.
Gangotri, Arun L. et al. "Systems and Methods and Program Applications for Selectively Restructuring the Placeshiftnig of Copy Protected Digital Media Content," U.S. Appl. No. 12/623,955, filed Nov. 23, 2009.
Paul, John et al. "Systems and Methods for Searching Media Content," U.S. Appl. No. 12/648,024, filed Dec. 28, 2009.
Newton's Telcom Dictionary, 20th ed., Mar. 2004.
"The Authoritative Dictionary of IEEE Standard Terms," 7th ed. 2000.
Gurzhi, Alexander et al. "Systems and Methods for Emulation Network-Enabled Media Components," U.S. Appl. No. 12/711,830, filed Feb. 24, 2010.
Bajpai, Parimal et al. "Systems and Methods of Controlling the Encoding of a Media Stream," U.S. Appl. No. 12/339,878, as filed Dec. 19, 2008.
Malone, Edward D. et al. "Systems and Methods for Controlling Media Devices," U.S. Appl. No. 12/256,344, as filed Oct. 22, 2008.
Banger, Shashidhar et al. "Systems and Methods for Determining Attributes of Media Items Accessed via a Personal Media Broadcaster," U.S. Appl. No. 12/334,959, as filed Dec. 15, 2008.
Kulkarni, Anant Madhava "Systems and Methods for Creating Logical Media Streams for Media Storage and Playback," U.S. Appl. No. 12/323,907, as filed Nov. 26, 2008.
Rao, Padmanabha R. "Systems and Methods for Linking Media Content," U.S. Appl. No. 12/359,784, as filed Jan. 26, 2009.
Krikorian, Blake Gary et al. "Systems and Methods for Presenting Media Content Obtained From Multiple Sources," U.S. Appl. No. 12/408,456, as filed Mar. 20, 2009.
Krikorian, Blake Gary et al. "Systems and Methods for Projecting Images From a Computer System," U.S. Appl. No. 12/408,460, as filed Mar. 20, 2009.
International Search Report and Written Opinion for International Application No. PCT/US2006/025911, mailed Jan. 3, 2007.
International Search Report for International Application No. PCT/US2007/063599, mailed Dec. 12, 2007.
International Search Report for International Application No. PCT/US2007/076337, mailed Oct. 20, 2008.
International Search Report and Written Opinion for International Application No. PCT/US2006/025912, mailed Jul. 17, 2008.
International Search Report for International Application No. PCT/US2008/059613, mailed Jul. 21, 2008.
International Search Report and Written Opinion for International Application No. PCT/US2008/080910, mailed Feb. 16, 2009.
Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control---Controlling-Your-Computer-With-a-Remote/?highlight=remote+control>; retrieved on Jan. 28, 2009.
Wikipedia "LocationFree Player" [Online], Sep. 22, 2007, XP002512400; retrieved from the Internet: <URL: http://en.wikipedia.org/w/index.php?title=LocationFree_Player&oldid=159683564>; retrieved on Jan. 28, 2009.
Sling Media Inc. "Slingbox User Guide" [Online] 2006, XP002512553; retrieved from the Internet: <URL:http://www.slingmedia.hk/attach/en-US_Slingbox_User_Guide_v1.2.pdf>; retrieved on Jan. 29, 2009.
Sony Corporation "LocationFree TV" [Online], 2004, SP002512410; retrieved from the Internet: <URL:http://www.docs.sony.com/release/LFX1_X5revision.pdf>; retrieved on Jan. 28, 2009 [note—document uploaded in two parts as file exceeds the 25MB size limit].
Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.
European Patent Office, International Searching Authority, "International Search Report," mailed Mar. 30, 2010; International Application PCT/US2009/068468 filed Dec. 27, 2009.
USPTO Final Office Action mailed Mar. 3, 2010; U.S. Appl. No. 11/111,265, filed Apr. 21, 2005.
USPTO Final Office Action mailed Mar. 12, 2010; U.S. Appl. No. 11/620,711, filed Jan. 7, 2007.

(56) References Cited

OTHER PUBLICATIONS

USPTO Non-Final Office Action mailed Mar. 19, 2010; U.S. Appl. No. 11/147,664, filed Jun. 7, 2005.
USPTO Non-Final Office Action mailed Mar. 31, 2010; U.S. Appl. No. 11/620,707, filed Jan. 7, 2007.
USPTO Non-Final Office Action mailed Apr. 1, 2010; U.S. Appl. No. 12/237,103, filed Sep. 24, 2008.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
China State Intellectual Property Office "Office Action" issued Mar. 18, 2010 for Application No. 200680022520.6.
China State Intellectual Property Office "Office Action" issued Apr. 13, 2010 for Application No. 200580026825.X.
Canadian Intellectual Property Office "Office Action" mailed Feb. 18, 2010 for Application No. 2569610.
European Patent Office "European Search Report," mailed May 7, 2010 for Application No. 06786174.0.
Margulis, Neal "Apparatus and Method for Effectively Implementing a Wireless Television System," U.S. Appl. No. 12/758,193, filed Apr. 12, 2010.
Margulis, Neal "Apparatus and Method for Effectively Implementing a Wireless Television System," U.S. Appl. No. 12/758,194, filed Apr. 12, 2010.
Margulis, Neal "Apparatus and Method for Effectively Implementing a Wireless Television System," U.S. Appl. No. 12/758,196, filed Apr. 12, 2010.
Kirkorian, Jason Gary et al. "Personal Media Broadcasting System with Output Buffer," U.S. Appl. No. 12/757,697, filed Apr. 9, 2010.
Tarra, Raghuveer et al. "Firmware Update for Consumer Electronic Device," U.S. Appl. No. 12/757,714, filed Apr. 9, 2010.
European Patent Office, European Search Report for European Application No. EP 08 16 7880, mailed Mar. 4, 2009.
Mythtv Wiki, "MythTV User Manual" [Online], Aug. 27, 2007, XP002515046; retrieved from the Internet: <URL:http://www.mythtv.org/wiki?title=User_Manual:Introduction&oldid=25549>.
International Searching Authority, Written Opinion and International Search Report for International Application No. PCT/US2008/077733, mailed Mar. 18, 2009.
International Searching Authority, Written Opinion and International Search Report for International Application No. PCT/US2008/087005, mailed Mar. 20, 2009.
Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.
Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.
Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.
Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.
USPTO, Non-Final Office Action mailed Dec. 17, 2004; U.S. Appl. No. 09/809,868, filed Mar. 15, 2001.
USPTO, Final Office Action mailed Jul. 28, 2005; U.S. Appl. No. 09/809,868, filed Mar. 15, 2001.
USPTO, Non-Final Office Action mailed Jan. 30, 2006; U.S. Appl. No. 09/809,868, filed Mar. 15, 2001.
USPTO, Final Office Action mailed Aug. 10, 2006; U.S. Appl. No. 09/809,868, filed Mar. 15, 2001.
USPTO, Non-Final Office Action mailed Jun. 19, 2007; U.S. Appl. No. 09/809,868, filed Mar. 15, 2001.
USPTO, Non-Final Office Action mailed Apr. 16, 2008; U.S. Appl. No. 09/809,868, filed Mar. 15, 2001.
USPTO, Final Office Action mailed Sep. 18, 2008; U.S. Appl. No. 09/809,868, filed Mar. 15, 2001.
USPTO, Non-Final Office Action mailed Mar. 31, 2009; U.S. Appl. No. 09/809,868, filed Mar. 15, 2001.
USPTO, Non-Final Office Action mailed May 1, 2008; U.S. Appl. No. 11/111,265, filed Apr. 21, 2005.
USPTO, Final Office Action mailed Dec. 29, 2008; U.S. Appl. No. 11/111,265, filed Apr. 21, 2005.
USPTO, Non-Final Office Action mailed Jun. 8, 2009; U.S. Appl. No. 11/111,265, filed Apr. 21, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.
USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,254, filed Jun. 30, 2006.
USPTO, Non-Final Office Action mailed May 15, 2009; U.S. Appl. No. 11/147,664, filed Jun. 7, 2005.
Sonic Blue "ReplayTV 5000 User's Guide," 2002, entire document.
Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
Microsoft Corporation; Harman/Kardon "Master Your Universe" 1999.
Matsushita Electric Corporation of America MicroCast: Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.
European Patent Office, International Searching Authority, "International Search Report and Written Opinion," mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.
Korean Intellectual Property Office "Official Notice of Preliminary Rejection," issued Jun. 18, 2010; Korean Patent Application No. 10-2008-7021254.
Krikorian, Jason, U.S. Appl. No. 11/734,277, filed Apr. 12, 2007.
Tarra, Raghuveer et al., U.S. Appl. No. 60/975,239, filed Sep. 26, 2007.
Williams, George Edward, U.S. Appl. No. 12/167,041, filed Jul. 2, 2008.
International Search Report and Written Opinion, PCT/US2005/020105, Feb. 15, 2007, 6 pages.
International Search Report and Written Opinion for PCT/US2006/04382, mailed Apr. 27, 2007.

(56) References Cited

OTHER PUBLICATIONS

Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.

Faucon, B. "TV 'Brick' Opens up Copyright Can of Worms, "Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01&pagetype+printer§ion+1053801318705&path+articles/2003/06/30/0156825330084.html.].

Balster, Eric J., "Video Compression and Rate Control Methods Based on the Wavelet Transform," The Ohio State University 2004, pp. 1-24.

Kulapala et al., "Comparison of Traffic and Quality Characteristics of Rate-Controlled Wavelet and DCT Video," Arizona State University, Oct. 11, 2004.

Skodras et al., "JPEG2000: The Upcoming Still Image Compression Standard," May 11, 2000, 14 pages.

Taubman et al., "Embedded Block Coding in JPEG2000," Feb. 23, 2001, pp. 1-8 of 36.

Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.

Roe, Kevin, "Third-Party Observation Under EPC Article 115 on the Patentability of an Invention," Dec. 21, 2007.

Roe, Kevin, Third-Party Submission for Published Application Under CFR §1.99, Mar. 26, 2008.

China State Intellectual Property Office "First Office Action," issued Jul. 31, 2009, for Application No. 200580026825.X.

USPTO, Non-Final Office Action, mailed Aug. 4, 2009; U.S. Appl. No. 11/734,277, filed Apr. 12, 2007.

USPTO, Final Office Action, mailed Jul. 31, 2009; U.S. Appl. No. 11/683,862, filed Mar. 8, 2007.

USPTO, Non-Final Office Action, mailed Aug. 5, 2009; U.S. Appl. No. 11/147,663, filed Jun. 7, 2005.

USPTO, Non-Final Office Action, mailed Sep. 3, 2009; U.S. Appl. No. 11/620,711, filed Jan. 7, 2007.

Einaudi, Andrew E. et al. "Systems and Methods for Selecting Media Content Obtained from Multiple Sources," U.S. Appl. No. 12/543,278, filed Aug. 18, 2009.

Malode, Deepak Ravi "Remote Control and Method for Automatically Adjusting the Volume Output of an Audio Device," U.S. Appl. No. 12/550,145, filed Aug. 28, 2009.

Akella, Aparna Sarma "Systems and Methods for Event Programming via a Remote Media Player," U.S. Appl. No. 12/537,057, filed Aug. 6, 2009.

Shah, Bhupendra Natwerlan et al. "Systems and Methods for Transcoding and Place Shifting Media Content," U.S. Appl. No. 12/548,130, filed Aug. 26, 2009.

Banger, Shashidhar et al. "Systems and Methods for Automatically Controlling the Resolution of Streaming Video Content," U.S. Appl. No. 12/537,785, filed Aug. 7, 2009.

Panigrahi, Biswaranjan "Home Media Aggregator System and Method," U.S. Appl. No. 12/538,681, filed Aug. 10, 2009.

Nandury, Venkata Kishore "Adaptive Gain Control for Digital Audio Samples in a Media Stream," U.S. Appl. No. 12/507,971, filed Jul. 23, 2009.

Shirali, Amey "Systems and Methods for Providing Programming Content," U.S. Appl. No. 12/538,676, filed Aug. 10, 2009.

Thiyagarajan, Venkatesan "Systems and Methods for Virtual Remote Control of Streamed Media," U.S. Appl. No. 12/538,664, filed Aug. 10, 2009.

Thiyagarajan, Venkatesan et al. "Localization Systems and Method," U.S. Appl. No. 12/538,783, filed Aug. 10, 2009.

Shirali, Amey et al. "Methods and Apparatus for Seeking Within a Media Stream Using Scene Detection," U.S. Appl. No. 12/538,784, filed Aug. 10, 2009.

Thiyagarajan, Venkatesan "Systems and Methods for Updating Firmware Over a Network," U.S. Appl. No. 12/538,661, filed Aug. 10, 2009.

Iyer, Satish "Methods and Apparatus for Fast Seeking Within a Media Stream Buffer," U.S. Appl. No. 12/538,659, filed Aug. 10, 2009.

European Patent Office, International Searching Authority, "International Search Report," for International Application No. PCT/US2009/049006, mailed Sep. 11, 2009.

USPTO "Final Office Action" mailed Feb. 10, 2012; U.S. Appl. No. 12/623,955, filed Nov. 23, 2009.

CIPO, "Office Action" mailed Jan. 9, 2012; Canadian Appln. No. 2,728,404.

Taiwan Intellectual Property Office "Office Action" issued Sep. 14, 2012 for Taiwan Patent Appln. No. 098121442.

Canadian Patent Office, Canadian Office Action for Canadian Patent Application No. 2,728,404, dated Aug. 17, 2011.

Arun L. Gangotri, Office Action for U.S. Appl. No. 12/623,955, dated Jul. 28, 2011.

Canadian Intellectual Property Office "Office Action" dated Jul. 25, 2012 for Canadian Patent Appln. No. 2,728,404.

China State Intellectual Property Office "Office Action" dated May 6, 2013 for China Patent Appln. No. 200980123484.

\* cited by examiner

SYSTEMS AND METHODS FOR SECURELY PLACE SHIFTING MEDIA CONTENT

TECHNICAL FIELD

The present invention generally relates to place shifting of media content, and more particularly relates to systems and methods for improving the security of media place shifting.

BACKGROUND

Most television viewers now receive their television signals through a content aggregator such as a cable or satellite television provider. For subscribers to a direct broadcast satellite (DBS) service, for example, television programming is received via a broadcast that is sent via a satellite to an antenna that is generally located on the exterior of a home or other structure. Other customers receive television programming through a cable, wireless or other medium. Programming is typically received at a receiver such as a "set top box" (STB) that demodulates the received signals and that converts the demodulated content into a format that can be presented to the viewer on a television or other display.

More recently, consumers have expressed significant interest in "place shifting" devices that allow viewing of television or other media content at locations other than their primary television set. Place shifting devices typically packetize media content that can be transmitted over a local or wide area network to a portable computer, mobile phone, personal digital assistant or other remote device capable of playing back the packetized media stream for the viewer. Placeshifting therefore allows consumers to view their media content from remote locations such as hotel rooms, offices, or any other locations where portable media player devices can gain access to a wireless or other communications network.

While placeshifting does greatly improve the convenience afforded to the viewer, the inherently insecure nature of many communications networks (such as the Internet) continues to pose challenges. That is, while it remains desirable to allow consumers to place shift their media playing experience, it is also desirable to ensure that only authorized users and players are allowed access to valuable media content.

It is therefore desirable to create systems and methods for securely placeshifting media content from a place shifting device to a remote media player. These and other desirable features and characteristics will become apparent from the subsequent detailed description and the appended claims, taken in conjunction with the accompanying drawings and this background section.

BRIEF SUMMARY

Various systems and methods are provided for securely providing a place-shifted media stream from a place shifting device to a remote player via a communications network. A request for a connection is received from the remote player at the place shifting device via the communications network. In response to the request for the connection, an authorization credential is requested from a central server via the communications network. Further, in response to the authorization credential received from the central server, the place-shifted media stream between the place shifting device and the remote player can be established over the communications network. At least a portion of the place-shifted media stream is encrypted based upon the authorization credential.

Other embodiments provide systems for securely providing a place-shifted media stream to a remote player via a communications network. The system comprises a network interface to the communications network and a receiver interface to a medium separate from the communications network. A receiver is configured to receive media content from the receiver interface, and a transcoder is configured to packetize the received media content for transport over the communications network. Control circuitry in communication with at least the network interface and the transcoder is configured to receive a request for a connection from the remote player via the network interface, to request an authorization credential from a central server via the network interface in response to the request for the connection, and, in response to receiving the authorization credential from the central server via the network interface, to establish the place-shifted media stream to the remote player via the network interface. In various embodiments, at least a portion of the place-shifted media stream may be encrypted based upon the authorization credential.

Still other embodiments provide a method of presenting a place-shifted media stream to a user of a remote device, wherein the place-shifted media stream is provided from a place shifting device to the remote device over a communications network. The user is authenticated to a central server via the communications network. Upon successful authentication with the central server, a connection to the place shifting device is requested. Upon receiving a response from the place shifting device, authorization is requested to connect to the place shifting device from the central server via the communications network. An authorization response comprising an authorization credential is received from the central server via the communications network, and the place-shifted media stream is established, In various embodiments, at least a portion of the place-shifted media stream may be encrypted based upon the authorization credential.

Still other embodiments provided a method of allowing a place-shifted media stream to be provided to a user of a remote device, wherein the place-shifted media stream is provided from a place shifting device to the remote device over a communications network. A first request is received from the remote device via the communications network, wherein the first request comprises a user credential associated with the user. The user credential is verified and, in response to successful verification, a first response is transmitted to the remote device that identifies the place shifting device. An authentication credential is then transmitted to the remote device in response to a second request from the remote device and to the place shifting device in response to a key request from the place shifting device to thereby allow the remote device and the place shifting device to establish the place-shifted media stream based at least in part upon the authentication credential. In various embodiments, at least a portion of the place-shifted media stream may be encrypted based upon the authorization credential.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary secure place-shifting system;

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Generally speaking, place shifting of media content is made more secure through the use of various authentication and/or encryption features. In various embodiments, the place shifting device verifies that it has an approved capability to provide placeshifting functions. This verification may be based upon "rights" set or modified on the placeshifting device by a human. Alternatively, placeshifting "rights" may be set or modified based upon information received via a satellite, cable or other connection that also provides programming content to the device. In other embodiments, authentication in real-time (or near real-time) can be performed to authenticate the user to a central server and/or to the placeshifting device, and/or to verify that the requesting remote player/device is authentic and approved to receive placeshifted content. A credential-sharing environment may be further constructed so that the transmitting and receiving devices receive cryptographic keys and/or other credentials from a secure central server. The authentication credentials provided from the central server can be used to encrypt some or all of the placeshifted media stream. In various further embodiments, the amount of encryption is adjusted based upon such factors as the quality of the video stream, the processing capabilities of the remote media player, the bandwidth of the intervening communications links, and/or other factors as appropriate. The various concepts described herein may be deployed independently from one another, or two or more may be combined with each other in any manner to produce an even more secure place shifting environment.

The secure mechanisms described herein may find particular benefit when used with hardware capable of both receiving television signals (e.g., signal feeds from a satellite, cable, wireless or other source) and of providing the place shifting function. The invention is not so limited, however; to the contrary, the security features described herein may be used in conjunction with conventional placeshifting systems and devices, including those that interact with other external devices such as television receivers, removable media players, digital or personal video recorders, and/or other sources of programming content.

Figure 1:
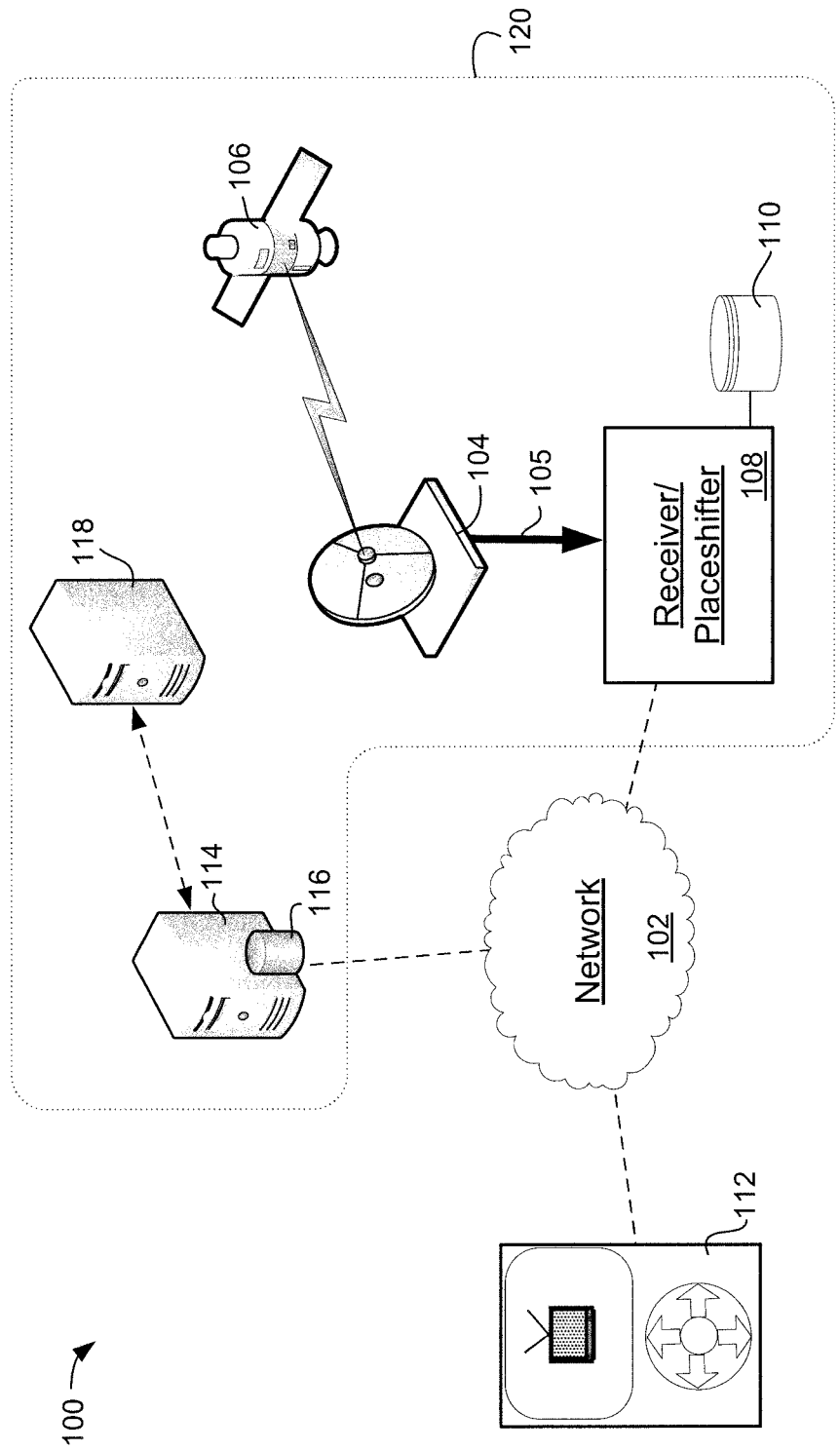

Turning now to the drawing figures and with initial reference to FIG. 1, an exemplary placeshifting system 100 suitably includes a placeshifting device 108 that packetizes media content for transmission to a remote device 112 over a communications network 102. In embodiments that provide enhanced security, a central server 114 that maintains a database 116 of information is also able to communicate with placeshifting device 108 and remote device 112 via network 102. Although FIG. 1 shows only a single placeshifting device 108, a single remote device 112 and a single central server 114, in practice system 100 may include any number of servers 114 that are able to interact with hundreds, thousands or even more placeshifting device 108, each of which may be able to stream media content to any number of different remote devices 112.

Network 102 is any digital or other communications network capable of transmitting messages between senders and receivers. In various embodiments, network 102 includes any number of public or private data connections, links or networks supporting any number of communications protocols. Network 102 may include the Internet, for example, or any other network based upon TCP/IP or other conventional protocols. In various embodiments, network 102 also incorporates a wireless and/or wired telephone network, such as a cellular communications network for communicating with mobile phones, personal digital assistants, and/or the like. Network 102 may also incorporate any sort of wireless or wired local area networks, such as one or more IEEE 802.3 and/or IEEE 802.11 networks. Placeshifting device 108 is therefore able to communicate with remote device 112 in any manner. Such communication may take place over a wide area link that includes the Internet and/or a telephone network, for example; in other embodiments, communications between devices 108 and 112 may take place over a wired or wireless local area link incorporated within network 102, with messages to central server 114 taking place over a wide area link also incorporated within network 102.

Placeshifting device 108 is any component, hardware, software logic and/or the like capable of transmitting a packetized stream of media content over network 102. In various embodiments, placeshifting device 102 incorporates suitable transcoder logic to convert audio/video or other media data into a packetized format that can be transmitted over network 102. The media data may be in any format, and may be received from any source such as a broadcast, cable or satellite television programming source, a "video-on-demand" or similar source, a digital video disk (DVD) or other removable media, a video camera, and/or the like. In various embodiments, placeshifter device 108 is any of the various SLING-BOX products available from Sling Media of Foster City, Calif., which are generally capable of receiving media content from an external digital video recorder (DVR), set top box (STB), cable or satellite programming source, DVD player, and/or the like.

In further embodiments, placeshifter device 108 may also include content receiving capabilities. That is, device 108 may be a hybrid STB or other receiver that also provides transcoding and placeshifting features, as described more fully below. Such a device may receive satellite, cable, broadcast and/or other signals that encode television programming 105 from an antenna 104, modem, server and/or other source. The receiver may further demodulate or otherwise decode the received signals 105 to extract programming that can be locally viewed and/or place shifted to a remote viewer 112 as appropriate. Such devices 108 may also include a content database 110 stored on a hard disk drive, memory, or other storage medium to support a personal or digital video recorder (DVR) feature as appropriate.

In the exemplary embodiment illustrated in FIG. 1, placeshifting device is a hybrid receiver/transcoder that receives digital broadcast satellite (DBS) signals 105 from a satellite 106 at an antenna 104. Equivalent embodiments, however, could receive programming 105 from a cable connection, broadcast source, removable media, service provider accessible via network 102, any external device and/or the like. In embodiments that include DVR functionality, programming may be stored in database 110 as desired (e.g., in response to user/viewer programming instructions) for subsequent viewing on a television or other display located in relatively close proximity; programming need not be stored in all instances or embodiments, however, and programming could be alternately provided in real time. As noted above, content may be presented on a television or other display that is physically connected to device 108, or may be placeshifted from device 108 to a remote device 112 over network 102.

Remote device 112 is any device, component, module, hardware, software and/or the like capable of receiving a media stream from placeshifting device 108. In various embodiments, remote device 112 is personal computer (e.g., a "laptop" or similarly portable computer, although desktop-type computers could also be used), a mobile phone, a personal digital assistant, a personal media player (such as the ARCHOS products available from the Archos company of Igny, France) or the like. In many embodiments, remote device 112 is a general purpose computing device that includes a media player application in software or firmware that is capable of securely connecting to placeshifting device 108, as described more fully below, and of receiving and presenting media content to the user of the device as appropriate.

Many different placeshifting scenarios could be formulated based upon available computing and communications resources, as well as consumer demand. In various embodiments, consumers may wish to placeshift content within a home, office or other structure, such as from a placeshifting device 108 to a desktop or portable computer located in another room. In such embodiments, the content stream will typically be provided over a wired or wireless local area network operating within the structure. In other embodiments, consumers may wish to placeshift content over a broadband or similar network connection from a primary location to a computer or other remote device 112 located in a second home, office, hotel or other remote location. In still other embodiments, consumers may wish to placeshift content to a mobile phone, personal digital assistant, media player, video game player, automotive or other vehicle media player, and/or other device via a mobile link (e.g., a GSM/EDGE or CDMA/EVDO connection, an IEEE 802.11 "Wi-fi" link, and/or the like). Several examples of placeshifting applications available for various platforms are provided by Sling Media of Foster City, Calif., although the concepts described herein could be used in conjunction with products and services available from any source.

As noted at the outset, it is generally desirable to maintain security of the placeshifting process to ensure that unauthorized users and unauthorized players do not gain access to programming content. This is particularly true when placeshifting device 108 is an integrated receiver/DVR/placeshifter, since the amount of valuable content available within the device could be significant. To maintain the security of the connection, then, various embodiments establish a logical barrier around a trusted domain or authorized zone 120, which may include the placeshifter device 118 itself, as well as any backend servers 114, 118 that are maintained by service providers or other trusted entities. By requiring users to interact within a secure infrastructure 100, suitable authentication or other security mechanisms can be implemented to prevent unauthorized access to resources contained within trusted domain 120.

To that end, a service provider may provide a central server 114 that interacts with placeshifting device 108 and/or mobile device 112 over network 102. Server 114 is any computer system or other computing resources that are able to respond to process requests for information received via network 102. Server 114 may, for example, maintain a database 116 that includes user account information, as well as cryptographic keys or other authentication credentials associated with the various placeshifting devices 108 as appropriate.

Central server 114 facilitates secure transactions between the remote device 112 and the placeshifting device 108 in any manner. In various embodiments, users of remote devices 102 are able to locate placeshifting devices 108 on network 102 by contacting central server 114, authenticating to server 114 with a userid/password pair or other credential, and then receiving information that allows a subsequent connection request to one or more placeshifting devices 108 associated with the user in database 116. The remote device 112 is then able to contact the placeshifting device 108 directly via network 102 to request a connection. Upon receiving connection requests from both placeshifting device 108 and remote device 112, central server 114 suitably provides a cryptographic key or other credential that can be used to establish a secure media stream between devices 108 and 112, as appropriate, and as more fully described below. Central server 114 is therefore able to greatly assist in maintaining the security of the placeshifted media stream, even though the server 114 need not be logically or physically interposed between the communicating devices 108 and 112.

In further embodiments, a server 114 involved with user authentication and/or key management may communicate with one or more backend servers 118 for additional security. Backend server 118 may have access to billing information, for example, that can be cross-checked against information received at server 114 to ensure that the user requesting services has properly paid for such services, has maintained an account in good standing, and/or the like. Queries to backend server 118 may be processed in real-time (or near real-time) over a secure link apart from network 102. In various embodiments, backend server 118 may be affiliated with a provider of satellite or cable television signals to device 108, for example. In such embodiments, server 118 could be used to ensure billing compliance, but could additionally (or alternatively) enable further services to the user in any manner. For example, a user authenticated with server 114 could order services (e.g., enablement of placeshifting features), issue an instruction to purchase a pay-per-view program or to record a program on a DVR associated with device 108, pay a bill, and/or take some other action with respect to the user's account with backend server 118 through the convenience of network 102. In embodiments wherein the user has ordered additional services or content, server 118 may coordinate messages transmitted via satellite 116 (or, equivalently, a cable connection or the like) to update settings on device 108 as appropriate. Because a secure connection within trusted domain 120 exists from server 114 to placeshifting device 108, new services and features can be enabled without data transmissions across relatively unsecured network 102.

Figure 2:
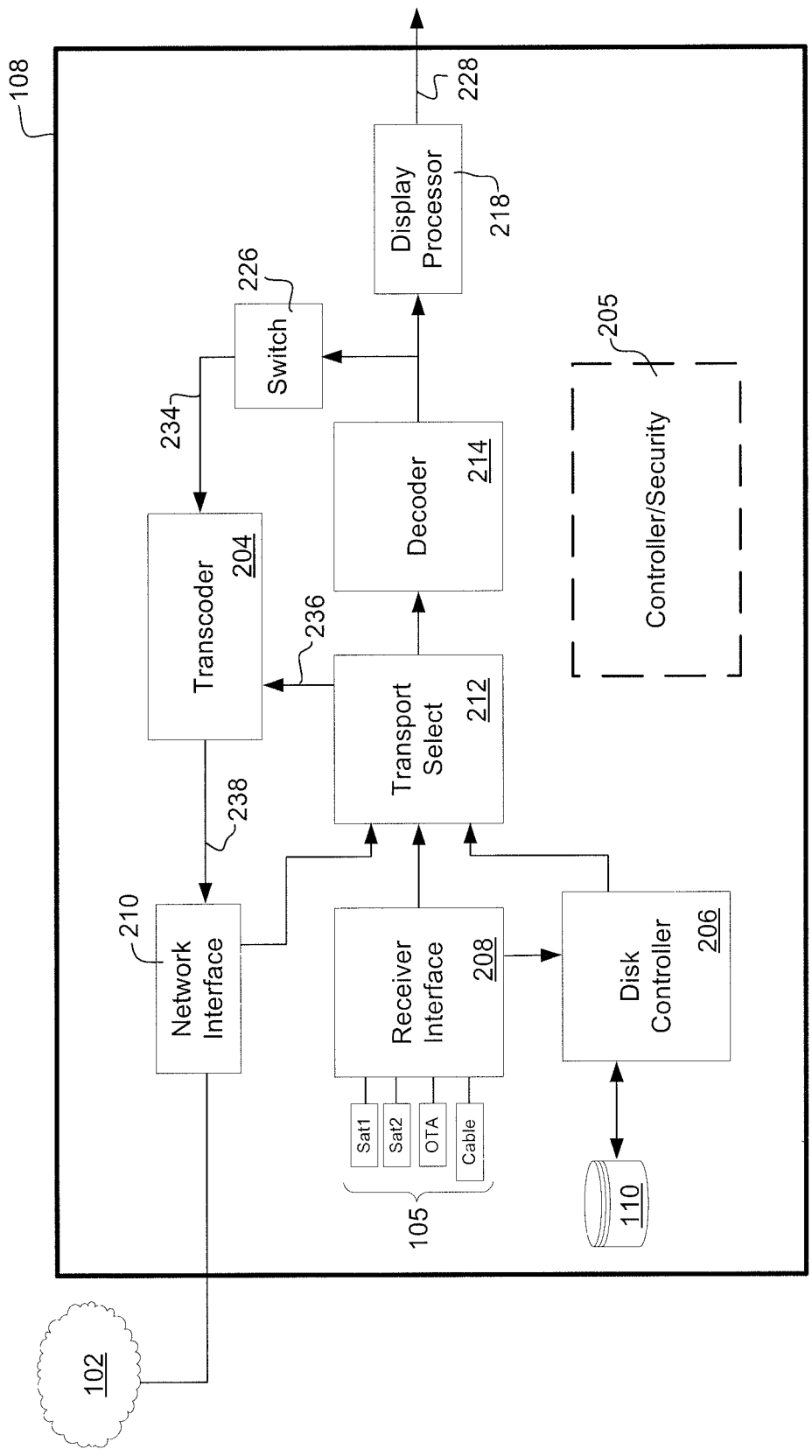
FIG. 2 is a block diagram of an exemplary placeshifting device.

FIG. 2 provides additional detail about an exemplary placeshifting device 108 that includes a receiver 208, a decoder 214 and a placeshifting transcoder 204, as appropriate. Although FIG. 2 describes a hybrid device 108 capable of receiving and decoding content in addition to placeshifting, the concepts set forth herein could be equivalently applied to devices 108 that simply provide placeshifting of media content received and/or decoded at an external receiver, DVR, media player, server and/or the like. Other embodiments may incorporate additional or alternate processing modules from those shown in FIG. 2, may omit one or more modules shown in FIG. 2, and/or may differently organize the various modules in any other manner different from the exemplary arrangement shown in FIG. 2.

Device 108 may be logically and physically implemented in any manner. FIG. 2 shows various logical and functional features that may be present in an exemplary device 108; each module shown in the figure may be implemented with any sort of hardware, software, firmware and/or the like. Any of the various modules may be implemented with any sort of general or special purpose integrated circuitry, for example, such as any sort of microprocessor, microcontroller, digital signal processor, programmed array and/or the like. Any number of the modules shown in FIG. 2, for example, may be implemented as a "system on a chip" (SoC) using any suitable processing circuitry under control of any appropriate control logic 205. In various embodiments, control logic 205 executes within an integrated SoC or other processor that implements receiver 208, transport selector 212, decoder 214, display processor 218 and/or disk controller 206, as appropriate. In such embodiments, the integrated SoC processor may interact with a transcoder module 204 implemented with a separate processor as well as any other input or output devices to produce desired outputs based upon inputs received from local or remote users. In other embodiments, transcoder 204 may also be incorporated into the SoC design. Broadcom Corporation of Irvine, Calif., for example, produces several models of processors (e.g., the model BCM 7400 family of processors) that are capable of supporting SoC implementations of satellite and/or cable receiver systems, although products from any number of other suppliers could be equivalently used. In still other embodiments, various distinct chips, circuits or components may be inter-connected and inter-relate with each other to implement the receiving and decoding functions represented in FIG. 2.

Various embodiments of device 108 therefore include any number of appropriate modules for obtaining and processing media content as desired for the particular embodiment. Each of these modules may be implemented in any combination of hardware and/or software using logic executed within any number of semiconductor chips or other processing logic.

Various embodiments of control logic 205 can include any circuitry, components, hardware, software and/or firmware logic capable of controlling the various components device 108. Various routines, methods and processes executed within device 108 are typically carried out under control of control logic 205, as described more fully below. In many embodiments, the various security and authentication features described with respect to FIG. 3 below are carried out primarily within control logic 205, which may be executing on any processor within device 108.

As noted above, many embodiments of device 108 include a receiver 208, which is any hardware, software, firmware and/or other logic capable of receiving media content via one or more content sources 105. In various embodiments, content sources 105 may include cable television, DBS, broadcast and/or other programming sources as appropriate. Receiver 208 appropriately selects a desired input source and provides the received content to an appropriate destination for further processing. In various embodiments, received programming may be provided in real-time (or near real-time) to a transport stream select module 212 or other component for immediate decoding and presentation to the user. Alternatively, receiver 208 may provide content received from any source to a disk or other storage medium in embodiments that provide DVR functionality. In such embodiments, device 108 may also include a disk controller module 206 that interacts with an internal or external hard disk, memory and/or other device that stores content in a database 110, as described above.

In the embodiment shown in FIG. 2, device 108 also includes an appropriate network interface 210, which operates using any implementation of protocols or other features to support communication by device 108 on network 102. In various embodiments, network interface 210 supports conventional LAN, WAN or other protocols (e.g., the TCP/IP or UDP/IP suite of protocols widely used on the Internet) to allow device 108 to communicate on network 102 as desired. Network interface 210 typically interfaces with network 102 using any sort of LAN adapter hardware, such as a conventional network interface card (NIC) or the like provided within device 108.

Transport stream select module 212 is any hardware and/or software logic capable of selecting a desired media stream from the available sources. In the embodiment shown in FIG. 2, stream select module 212 is able to generate video signals for presentation on one or more output interfaces 228. In various embodiments, stream select module 212 is also able to provide an encoded video signal 236 to transcoding module 204, although this feature is entirely optional. In such embodiments, however, transcoding module 204 would decode the video signal 236 for packetizing and subsequent transmittal over network 102, as described elsewhere.

More typically, however, stream select module 212 responds to viewer inputs (e.g., via control logic 205) to simply switch encoded content received from a live source 105 or from storage 110 to one or more decoder modules 214. Device 108 may include any number of decoder modules 214 for decoding, decompressing and/or otherwise processing received/stored content as desired. Generally speaking, decoder module 214 decompresses or otherwise processes received content from stream select module 212 to extract an MPEG or other media stream encoded within the stream. The decoded content can then be processed by a display processor modules 218 to create a display for the viewer in any appropriate format.

Display processor module 218 includes any appropriate hardware, software and/or other logic to create desired screen displays at interfaces 242, 244, 246 as desired. In various embodiments, display processing module 218 is also able to produce on screen displays (OSDs) for electronic program guide, setup and control, input/output facilitation and/or other features that may vary from embodiment to embodiment. Such displays are not typically contained within the received or stored broadcast stream, but are nevertheless useful to users in interacting with device 108 or the like. The generated displays, including received/stored content and any other displays may then be presented to one or more output interfaces 228 in any desired format. In various embodiments, display processor 218 produces an output signal encoded in any standard format (e.g., ITU656 format for standard definition television signals or any format for high definition television signals) that can be readily converted to standard and/or high definition television signals at interface 228.

In hybrid receiver/placeshifter devices 108, a hardware or software switch 226 may also be provided that allows one or more output channels to be diverted to a transcoding module 204 for placeshifting over network 102. In such embodiments, switch 226 suitably re-directs output from one of the output channels (e.g., channel 228) in decoded and decompressed form to the transcoding module 204 as appropriate. An output signal encoded in ITU656 format, for example, may be provided as an input to transcoding module 204 to support digital-to-digital conversion to a media format that can be readily transmitted on network 102. In other embodiments, digital or analog signals may be provided to transcoder 204 in any format.

To that end, transcoding module 204 is any hardware, software, firmware and/or combination thereof that is capable of producing a media stream capable of being routed on network 102 to a remote device 112. In various embodiments, transcoding module is implemented in a semiconductor chip having digital signal processing capabilities, such as a DAVINCI model processor available from the Texas Instruments Corporation of Dallas, Tex., although other embodiments may use any sort of processor or other circuitry (including the same processor or other circuitry used to implement any other components shown in FIG. 2) to implement the transcoding function. Generally speaking, transcoding module 204 receives either a decoded signal 234 decoded by decoders 214 or 216 (and optionally further processed by display processors 218 or 220) or an already encoded stream 236, performs a digital-to-digital conversion to create a media stream in a desired format and having desired parameters, and provides the converted stream for transport on network 102. One example of a placeshifting system that includes transcoding capabilities is described in U.S. Patent Publication 2006/0095471, although other placeshifting and/or transcoding features may be implemented in a wide array of alternate embodiments. FIG. 2 shows the output 238 of transcoding module 204, which includes the placeshifted video stream, as being provided for transport using network interface 210. In an alternate embodiment, a different network interface 210 could be provided, such as a stack residing within module 204 itself. In various embodiments, it may be desirable to secure any inter-chip communications between transcoding module 204 and other components of device 108 through any sort of physical or logical security techniques. Signals 234, 236 and/or 238 may be provided on signal pins that are physically embedded within a printed circuit board, for example, to make access to such signals more difficult. Further, signals 234, 236 and/or 238 may be encrypted or encoded between modules in any manner to prevent unauthorized usage in the event that such signals are physically intercepted.

In operation, then, placeshifting device 108 suitably receives one or more media streams from a DBS, cable or other source 105, which may be stored in a DVR database 110 or the like as desired. Received and/or stored content may be provided in compressed form (e.g., signal 236) and/or decompressed form (e.g., signal 234) to transcoding module 204, which appropriately converts the received signals to a format that can be transmitted to the remote device 112 over network 110. Control of the placeshifting process, including any communications related to security or authentication, may take place under the direction of control logic 205 executing within device 108.

Figure 3:
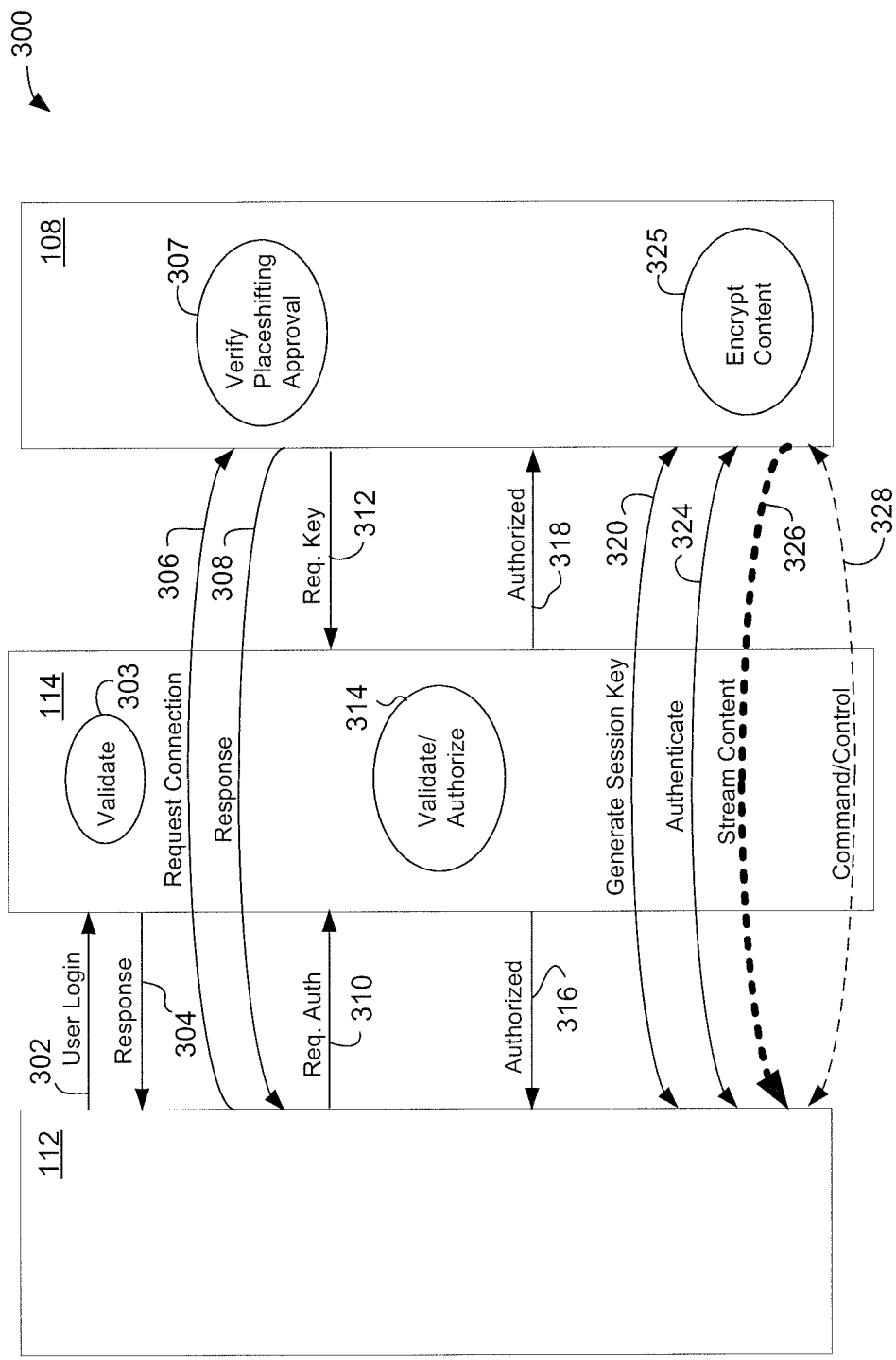
FIG. 3 is a data flow diagram showing exemplary processes for establishing secure placeshifting between a place shifting device and a remote device.

FIG. 3 shows an exemplary process 300 for securely establishing a placeshifting media stream between a placeshifting device 108 and a remote device 112. FIG. 3 shows messages sent and received by each of the entities 108, 112, 114 involved in the security process 300, as well as other actions that may be performed by one or more entities within system 100 (FIG. 1). In practice, the overall process 300 may be implemented with various methods executed by one or more entities 108, 110, 112, as described more fully below. Generally speaking, each of the method steps shown in FIG. 3 may be implemented in software or firmware that may be stored in memory, mass storage or any other storage medium available to the executing device, and that may be executed on any processor or control circuitry associated with the executing device.

Process 300 typically begins with the remote device 112 contacting the central server with a login request (step 302). This may be initiated by, for example, a user of remote device 102 opening a media player application, or otherwise initiating the process of viewing placeshifted media. Step 302 may include providing any sort of identifying information associated with the user, such as any sort of userid/password pair. Alternatively, step 302 could provide a digital signature, any other cryptographic credential, biometric information, and/or any other sort of identifying information to ensure the identity of the user. Step 302 may also include a digital signature, identifier or other credential associated with a media player application or other component of device 112 to ensure that the application is authorized to participate in process 300. Central server 114 suitably validates the received information (step 303) in any manner (e.g., by querying database 116 in FIG. 1). If validation is successful, the user is identified, and a response message may be sent (step 304). In the event that the media player application is out of date, such information may be used to prompt the user to obtain updated software, or for any other purpose.

Response message 304 includes any information that allows the remote device to establish a connection to a desired placeshifting device 108. In various embodiments, response 304 may include address information (e.g., an Internet Protocol (IP) address) relating to one or more placeshifting devices 108 associated with the user's account in a directory or other listing. The response 304 may also include user preferences or other settings established by the user for added convenience.

Upon successful authentication with the central server 114, the remote device 112 is able to request a connection to a particular placeshifting device 108 via network 102 (step 306). This request may be sent using any suitable protocol or other format that can be received an interpreted by placeshifting device 108. In an exemplary embodiment, response 304 includes an IP address or other identifier associated with the placeshifting device 108 that allows the remote device 112 to contact the desired placeshifting device 108 directly via network 102.

Placeshifting device 108 is able to verify the capability to perform placeshifting in any manner (step 307). In various embodiments, device 108 receives a flag or other indication via a separate data connection other than network 102 that indicates availability of placeshifting "rights". For example, in embodiments wherein device 108 includes the ability to receive cable or satellite signals, a placeshifting enablement message may be embedded within signals 105 transmitted to device 108 via the cable or satellite connection, respectively. In other embodiments, a human physically close to device 108 may be alerted by device 108 to authorize placeshifting. In either case, device 108 may not accept placeshifting requests until placeshifting "rights" are expressly enabled on the device. This may be verified by checking that placeshifting is approved (step 307) just prior to validating the user's request for connection, as shown in FIG. 3, or by simply ignoring requests 306 for placeshifting connections until approval for placeshifting is received.

Placeshifting may be enabled or disabled in any manner, and/or may be differently applied based upon the location or capabilities of remote device 112. For example, placeshifting device 108 may be configured to recognize several "tiers" of service so that placeshifting is enabled only for local area networks, for example, or only for wide area networks. Such functionality may be implemented by comparing IP or other network addresses of devices 108 and 112, for example, when limited placeshifting is enabled. Placeshifting within any particular device 108 may be enabled, disabled, or otherwise adjusted in any manner and on any temporal basis by simply updating the placeshifting "flag" or other data provided to device 108.

If placeshifting is enabled on device 108, then a response message 308 is sent to remote device 112 via network 102. In various embodiments, device 112 also submits a request 312 to central server 114 for an authorization credential that can be used to secure the placeshifted media stream, as described below. Upon receipt of response 308 from placeshifting device 108, remote device 112 also submits a request 310 to central server 114 to obtain the authorization credential that permits secure communication with the particular placeshifting device 108. In various embodiments, the authorization credential is a cryptographic key, such as a symmetric encryption key or the like that permits subsequent secure communications based upon a shared secret. Conventional keys of any length (e.g., 64 or 128 bits) associated with advanced encryption standard (AES) or data encryption standard (DES) algorithms, for example, could be used in various embodiments. In various embodiments, the authorization credential is associated with the particular placeshifting device 108, and may be updated on any temporal basis. Keys may be updated on a periodic or aperiodic basis, for example, or a unique key may be provided in response to each request 312 for added security.

Upon receiving requests 310 and 312, central server 114 suitably validates and authorizes the placeshifting session (step 314). Step 314 may involve querying a backend server 118, for example, to ensure that the placeshifting is approved for the particular user, remote device 112 and/or placeshifting device 108. Alternatively, verification may be resolved locally at central server using database 116 (FIG. 1) or the like. If the transaction is approved, then the authorization credential is transmitted from server 114 to the remote device as message 316, and to the placeshifting device 108 as message 318. In embodiments wherein the credential is already stored within device 108, message 318 may not necessarily include another copy of the credential, but may instead provide an indication that placeshifting with remote device 112 is approved. Authorization credentials will typically be provided using relatively secure connections (e.g., secure hypertext transport protocol (HTTPS) or the like) to prevent any third parties from obtaining the credential through eavesdropping or similar techniques.

When both placeshifting device 108 and remote device 112 have received authorization 316, 318 from the central server 114, then a secure connection may be established directly between the two devices 108, 112 via network 102. A session key 320 may be generated by each party, for example, using conventional techniques (e.g., as set forth in the AES, DES or other algorithms) and using parameters provided from central server 114. This session key may be based upon the received authentication credential, for example, to allow for mutual encryption/decryption of ensuing communications. The session key is typically negotiated based upon the received credential, and also based upon one or more other parameters known to the communicating devices. These parameters may be embedded within software previously provided (e.g., within a media player application provided to device 112, and/or within a firmware update to device 108) to further enhance placeshifting security. These parameters may be defined in any manner (e.g., in accordance with well-known encryption protocols such as AES, DES and/or the like) and may be updated on any temporal basis. In the event that the cryptographic systems described in FIG. 3 become compromised, for example, a firmware update to device 108 and/or a player update to device 112 may be required to update the various parameters prior to receiving any future approvals (e.g, messages 316, 318) from central server 114.

In various embodiments, a user of remote device 112 may also authenticate separately with placeshifting device 108 (step 324) to further enhance the security of process 300. This authentication may involve providing a userid/password pair, a digital signature, biometric data, and/or any other identifying information associated with the user to placeshifting device 108. Such information may be configured by the user prior to establishing the placeshifting session in any manner. Although FIG. 3 shows authentication step 324 as occurring after negotiation of the session key, such authentication may take place at any point within process 300. Authentication 324 may take place prior to placing of key request 312, for example. Other embodiments may eliminate the additional authentication in step 324 entirely, or make such authentication optional at the discretion of the user or any administrator.

When authentication is complete and the various encryption parameters are properly in place, the placeshifting media stream 326 can be provided over network 102 to remote device 102. Typically, some or all of the content contained within media stream 326 is encrypted (step 325), as described more fully below. Transcoding, encryption and transmission of content in media stream 326 may be adjusted in any manner during operation (step 328). In various embodiments, the media player application associated with remote player 112 provides command and control information to device 108 that may be used to adjust or otherwise control transcoding, encryption or transmission as desired.

From the varying perspectives of devices 108, 112 and central server 114, then, various methods for establishing a secure placeshifting session are described in FIG. 3. With respect to placeshifting device 108, for example, establishing a secure connection suitably includes the broad steps of receiving a request for connection 306 from the remote device, verifying that a placeshifting feature is available within device 307, and then requesting approval for the session from the central server (step 312). In response to the received approval (step 318), which may include a cryptographic key or other authentication credential, placeshifting device 108 is able to establish the secure media stream 326 based upon the received credential. The various steps of this method may be carried out by any processing circuitry or logic associated with device 108, including control logic 205 shown operating in FIG. 2.

With respect to the remote device 112, an initial request is placed to central server 114, which responds 304 with an address or other information about placeshifting device 108. The remote device 112 is then able to request a connection (step 306) from the placeshifting device, and to request the key or other credential upon receipt of a response 308 from device 108. The received credential can then be used to negotiate or otherwise establish the parameters of the secure media stream 326, and to decrypt the content transferred as part of the stream. The various steps of this method may be executed within a media player application or other software executing on remote device 112.

With respect to the central server 114, the initial request 302 is received from remote device 112 and validated (step 303) as appropriate. If the request is valid, information about the placeshifting device 108 is provided (step 304) to allow the remote device 112 to contact the placeshifting device 108 directly. Upon receipt of subsequent requests 310, 312 from device 112, 108 (respectively), central server 114 suitably validates and authorizes the session in any appropriate manner, and transmits the key or other authentication credential to the remote device 112 and/or placeshifting device 112 in any manner. Devices 108 and 112 are then able to independently negotiate the parameters of the secure media stream 326 based upon the shared credential. The various functions and other features of this method may be executed on one or more processors associated with server 114 and/or backend server 118 (FIG. 1), as appropriate.

Figure 4:
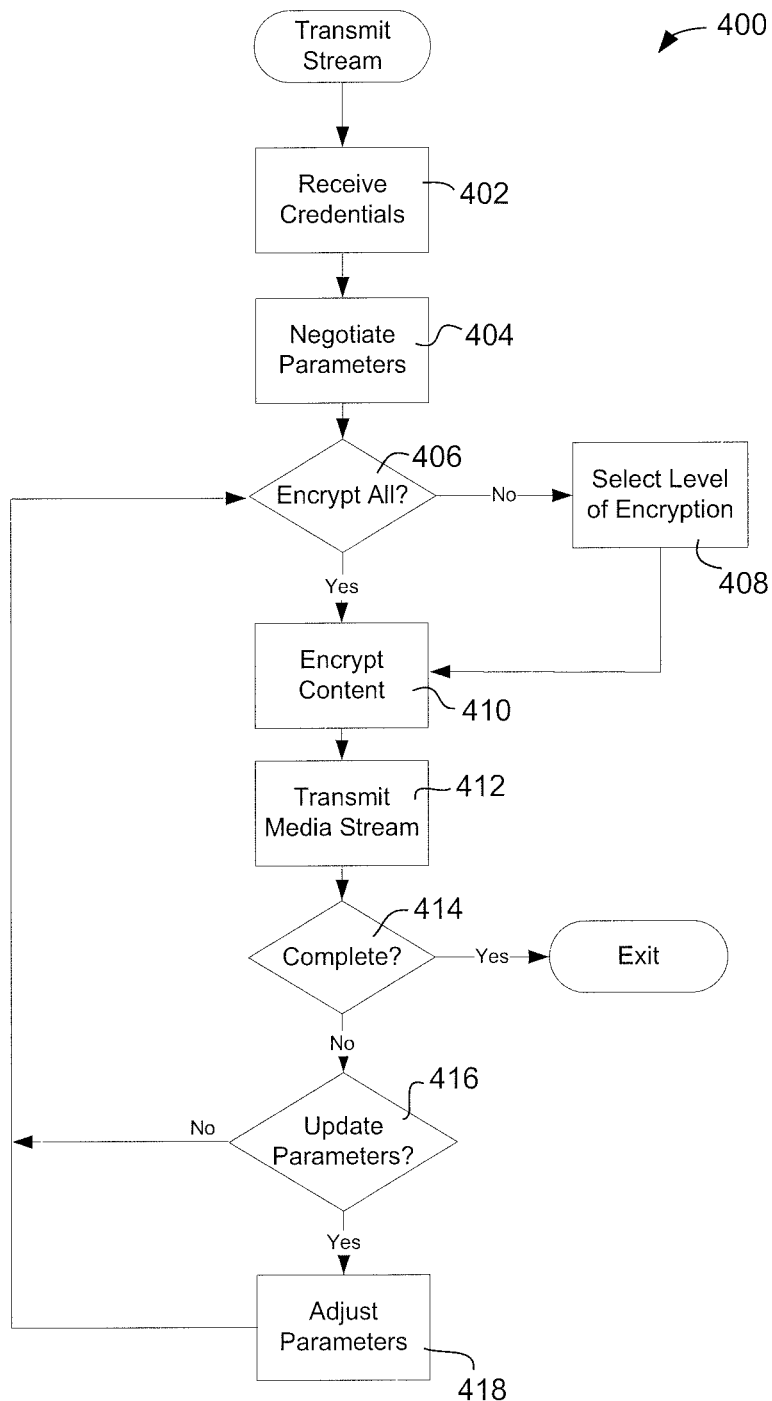
FIG. 4 is a flowchart of an exemplary process for transmitting an encrypted media stream to the remote player.

FIG. 4 shows additional detail about an exemplary technique for transmitting a secure media stream 326 from a placeshifting device 108 to a remote device 112. The various steps shown in FIG. 4 may be executed in software, firmware and/or hardware logic residing within device 108, such as control logic 205 shown operating in conjunction with the various other modules (including transcoder module 204) in FIG. 2.

As noted above, placeshifting device 108 receives authentication credentials (e.g., a cryptographic key) in any manner (step 402). Unique credentials may be provided for each requested session in some embodiments, or a key/credential may be securely stored within device 108 for use in conjunction with multiple placeshifting sessions. In either event, a session key and/or other parameters for a particular placeshifting session may be negotiated with remote device 112 (step 404) based upon the secret information shared between the two devices using any technique, such as conventional AES cryptography.

In some embodiments, resources may be available to encrypt the virtual entirety of media stream 326. In other embodiments (step 406), however, it may not be necessary or desirable to encrypt the entire stream. In embodiments wherein the transcoded media stream is of relatively low quality (e.g., a relatively low bit resolution) in comparison to the received signal, for example, cryptography may be reduced or eliminated. Further, when the remote device has limited computing resources (e.g., a mobile phone or the like), the computational demands of strong cryptography may detract from the user experience. Similarly, if the media stream 326 is being transferred over a relatively low bandwidth link (e.g., a relatively slow telephone connection), the added delay imposed by cryptography may be undesirable. As a result, the level of cryptography applied by the placeshifting device may be selected (step 408) based upon such factors as the quality of the transmitted media stream, the processing capabilities of remote device 112, and/or the bandwidth of the intervening communications network 102.

Cryptography may be applied in any manner (step 410). In various embodiments, cryptography may be applied in any number of "levels", ranging from no encryption, to partial encryption, to encryption of the entire stream depending upon the various factors. "Partial encryption" in this sense can refer to encrypting only certain frames of the media stream, and/or to encrypting only certain blocks of one or more frames. That is, by encrypting only a portion of the transmitted media, security can be maintained without unduly increasing computational overhead. In a conventional MPEG-type video stream, for example, the more fundamental video frames (e.g., I-frames) can be encrypted, with reduced encryption applied to the more heavily compressed frames (e.g, P-frames and/or B-frames). Encrypting only a portion of the macroblocks making up the various frames can similarly reduce computational demands. As one example, a "high" level of encryption could encrypt every outgoing frame of media stream 326, whereas a "medium" level could encrypt a lesser amount, for example between 25-75 percent or so of the blocks in some or all of the I, P and/or B frames. Additional levels could be added for any level of resolution desired.

In further embodiments, the particular blocks that are encrypted could be assigned in any manner, including randomly. That is, the particular blocks may be randomly selected to further enhance the security of the system. Randomizing the encrypted blocks could have a further advantage in terms of spreading processor loading as well, thereby further improving system performance during encryption. The particular randomly-selected blocks may be called out to the receiving party in any manner, such as through header identification, control messages and/or the like to facilitate efficient decryption of media stream 326.

Media stream 326 is therefore encrypted and transmitted to remote device 108 in any manner (step 412) until the placeshifting session is complete (step 414). As noted above, various transcoding, encryption and/or transmission parameters of stream 326 may be adjusted during operation as desired (step 416). If the bandwidth of the connection 102 should degrade, for example, or the processing capabilities of remote device 112 become overloaded, it may be desirable to reduce the quality of the media stream and/or to reduce the amount of encryption applied in step 410. Any of the various parameters used in transcoding and/or encrypting media stream 326 may be adjusted upwardly or downwardly as appropriate to compensate for changing conditions (step 418). In an exemplary embodiment, the encryption level may be set and/or adjusted according to the video bitrate and/or video resolution. High definition video, for example, may always be encrypted at a relatively high level, whereas standard definition video may be encrypted at lower levels in some embodiments, particularly if the video bitrate is relatively low. Various encryption parameters and criteria could be established across a wide range of alternate embodiments.

Using the various systems, methods and other concepts described herein, a number of advantages may be achieved. By requiring authentication to a central server and/or to the placeshifting device, for example, access to placeshifted content can be limited to authorized users. Moreover, by unauthorized media player applications can be rejected through authentication to the central server and/or the use of system secrets for generating session keys. The use of a central server allows for convenient upgrading/updating of keys or player applications in the event of security breach, thereby greatly enhancing system renewability. Moreover, streaming content is encrypted end-to-end, thereby reducing access by untrusted or unapproved third parties. The level of encryption applied may be adjusted based upon video quality, environmental factors and/or the like, further improving system performance. As noted at the outset, the various features may be selectively applied, and not all features will be found in all embodiments.

As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method executable by a place shifting device for securely providing a place-shifted media stream from the place shifting device to a remote player via a communications network, the method comprising:

receiving a request for a connection from the remote player at the place shifting device via the communications network;

in response to the request for the connection, requesting an authorization credential from a remotely located central server via the communications network wherein the remotely-located central server is separate from both the remote player and the place shifting device, wherein the authorization credential is generated by the central server to authorize a placeshifting session between the remote device and the place shifting device, and wherein the authorization credential is provided from the central server to both the remote player and the place shifting device via the communications network; and establishing the placeshifting session between the place shifting device and the remote player over the communications network using the authorization credential received from the remotely located central server to thereby securely provide the place-shifted media stream from the place shifting device to the remote device.

2. The method of claim 1 wherein at least a portion of the place-shifted media stream is encrypted based upon the authorization credential that is received from the remotely-located central server.

3. The method of claim 1 further comprising verifying that placeshifting is approved between the place shifting device and the remote player prior to requesting the authorization credential.

4. The method of claim 3 wherein the verifying is based at least in part upon a location of the remote player.

5. The method of claim 3 wherein the verifying is based at least in part upon an approval received via a medium separate from the communications network.

6. The method of claim 1 further comprising authenticating a user of the remote player at the place-shifting device prior to establishing the place-shifted media stream.

7. The method of claim 1 wherein the authorization credential comprises a symmetric encryption key that is also provided from the remotely located central server to the remote player.

8. The method of claim 7 wherein the symmetric encryption key is provided from the remotely located central server to the remote player over the communications network in response to a request received from the remote player at the remotely located central server.

9. The method of claim 8 wherein the establishing of the place-shifted media stream comprises negotiating encryption parameters for the place-shifted media stream between the remote player and the placeshifting device based at least in part upon the symmetric encryption key received from the remotely located central server.

10. The method of claim 1 further comprising selecting one of a plurality of available encryption levels for the place-shifted media stream, and wherein at least a portion of the place-shifted media stream is encrypted based upon the authorization credential.

11. The method of claim 10 wherein the selected encryption level is determined at least in part upon a quality of the place-shifted media stream.

12. The method of claim 10 wherein the selected encryption level is determined at least in part upon a processing capability of the remote player.

13. The method of claim 10 wherein the selected encryption level is determined at least in part upon a bandwidth of the communications network.

14. The method of claim 1 wherein the place-shifted media stream is provided based upon media content received via a medium separate from the communications network and decoded at the place-shifting device.

15. The method of claim 14 further comprising verifying that placeshifting is approved between the place shifting device and the remote player prior to requesting the authorization credential, wherein the verifying is based at least in part upon an approval received via the medium separate from the communications network.

16. The method of claim 14 wherein the medium separate from the communications network comprises a satellite link.

17. A system for securely providing a place-shifted media stream to a remote player via a communications network, the system comprising:

a network interface to the communications network;

a receiver configured to receive media content from a medium separate from the communications network;

a transcoder configured to packetize the received media content for transport over the communications network; and control circuitry in communication with at least the network interface and the transcoder, wherein the control circuitry is configured to receive a request for a connection from the remote player via the network interface, to request an authorization credential from a remotely-located central server via the network interface in response to the request for the connection, and to establish a placeshifting session with the remote player via the network interface after receiving the authorization credential from the remotely located central server to thereby provide the place-shifted media stream to the remote device, wherein the remotely-located central server is separate from both the remote player and the system, wherein the authorization credential is generated by the remotely-located central server, wherein the authorization credential is provided from the remotely-located central server to both the remote player and to the system via the communications network to authorize the placeshifting session between the remote device and the system.

18. The system of claim 17 wherein the control circuitry is further configured to negotiate encryption parameters for the place-shifted media stream with the remote player based at least in part upon the authorization credential received from the remotely located central server.

19. The system of claim 17 wherein the control circuitry is further configured to encrypt at least a portion of the place-shifted media stream based upon the authorization credential received from the remotely located central server.

20. The system of claim 19 wherein the control circuitry is further configured to encrypt only a portion of the place-shifted media stream.

21. The system of claim 20 wherein the size of the portion is determined at least in part upon a quality of the place-shifted media stream.

22. The system of claim 20 wherein the encrypted portion corresponds to selected blocks of video frames contained within the place-shifted media stream.

23. The system of claim 22 wherein the blocks are randomly selected.

24. The system of claim 17 wherein the receiver is a direct broadcast satellite receiver, wherein the medium separate from the communications network is a satellite broadcast receivable by the direct broadcast satellite receiver, and wherein the control circuitry is further configured to verify that placeshifting is approved between the place shifting device and the remote player prior to requesting the authorization credential from the remotely located central server, wherein the verification is performed at the placeshifting device based upon an approval received at the placeshifting device via the satellite broadcast receivable by the direct broadcast satellite receiver.

25. The system of claim 17 wherein the receiver is configured to decode the media content and to provide the decoded media content to the transcoder.

26. A method of presenting a place-shifted media stream to a user of a remote device, wherein the place-shifted media stream is provided from a place shifting device to the remote device over a communications network, the method comprising:
    authenticating the user to a central server via the communications network;
    after successful authentication with the central server, requesting a connection to the place shifting device;
    after receiving a response from the place shifting device, requesting authorization to connect to the place shifting device from the central server via the communications network, wherein the central server is separate from both the remote device and the place shifting device;
    receiving an authorization response from the central server via the communications network, wherein the authorization response comprises an authorization credential generated by the central server to authorize a placeshifting session between the remote device and the place shifting device, and wherein the authorization credential is provided from the central server to both the remote device and to the place shifting device via the communications network; and
    establishing the place shifting session with the place shifting device over the communications network using the authorization credential to thereby securely receive the place-shifted media stream from the place shifting device at the remote device.

27. The method of claim 26 wherein at least a portion of the place-shifted media stream is encrypted based at least in part upon the authorization credential.

28. The method of claim 26 further comprising authenticating the user to the place shifting device via the communications network.

29. The method of claim 26 wherein the authorization credential comprises a symmetric encryption key that is also provided from the central server to the place shifting device.

30. The method of claim 29 further comprising negotiating encryption parameters for the place-shifted media stream with the place shifting device based at least in part upon the received authorization credential.

31. The method of claim 27 further comprising decrypting only a portion of the place-shifted media stream.

32. The method of claim 31 wherein the size of the portion is determined at least in part upon a quality of the place-shifted media stream.

33. A method executable by a central server to securely allow a place-shifted media stream to be provided to a user of a remote device, wherein the place-shifted media stream is provided from a remotely located place shifting device to the remote device over a communications network, the method comprising:
    receiving a first request from the remote device via the communications network at the central server, wherein the first request comprises a user credential associated with the user, and wherein the central server is separate from the place shifting device and from the remote device;
    verifying the user credential at the central server and, in response to successful verification, transmitting a first response from the central server to the remote device that identifies the remotely located place shifting device; and
    in response to a second request from the remote device received at the central server, the central server generating an authentication credential that authorizes a video streaming session between the remote device and the place shifting device, and transmitting the authorization credential generated by the central server to both the remote device and the remotely located place shifting device to thereby allow the remote device and the remotely located place shifting device to establish the place-shifted media stream from the place shifting device to the remote device using the authorization credential generated by the central server.

34. The method of claim 33 wherein the place-shifted media stream is encrypted at least in part based upon the authentication credential.

35. The method of claim 33 wherein the authentication credential is transmitted to the remotely located place shifting device in response to a key request from the place shifting device.

36. The method of claim 33 further comprising validating that the user is authorized to connect to the remotely located place shifting device.

37. The method of claim 36 wherein the validating comprises querying an account server having an entry associated with the user.

38. The method of claim 37 wherein the account server is associated with a service provider providing media content to the remotely located place shifting device via a medium separate from the communications network.

* * * * *